United States Patent Office 3,780,164
Patented Dec. 18, 1973

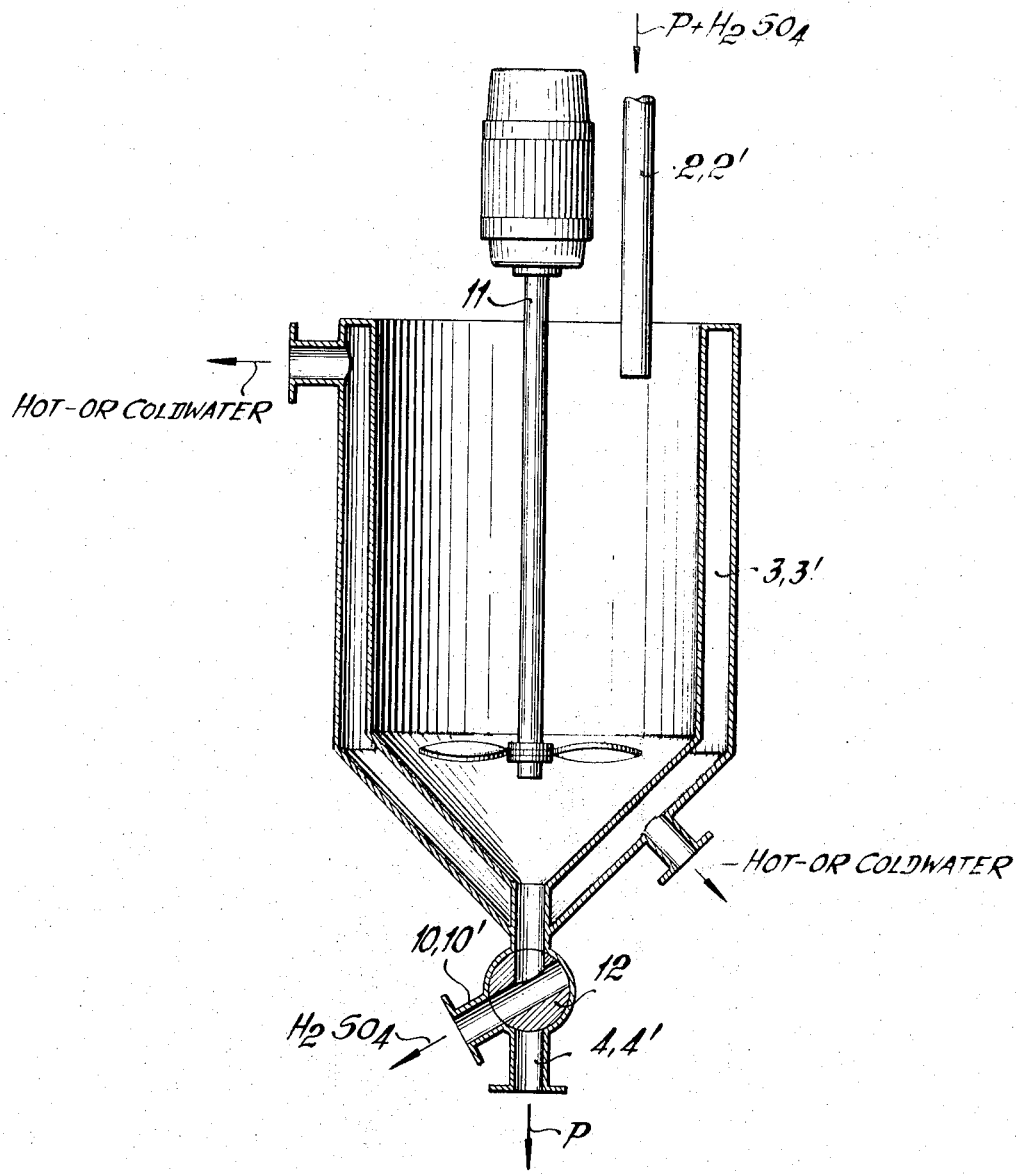

3,780,164
PURIFICATION OF YELLOW PHOSPHORUS
Fritz Muller, Knapsack, Karl-Heinz Stendenbach, Ruhl-Pingsdorf, Gerhard Hartlapp, Hermulheim, Wilhelm Forst, Tiengen, and Hermann Schrodter, Hermulheim, Germany, assignors to Knapsack Aktiengesellschaft, Knapsack, near Cologne, Germany
Filed July 9, 1971, Ser. No. 161,021
Claims priority, application Germany, July 17, 1970, P 20 35 432.9
Int. Cl. C01b 25/02, 25/04
U.S. Cl. 423—322  5 Claims

ABSTRACT OF THE DISCLOSURE

Purification of yellow phosphorus, which may have been produced by electrothermal means, by intimately mixing liquid phosphorus with sulfuric acid.

Figure 1:
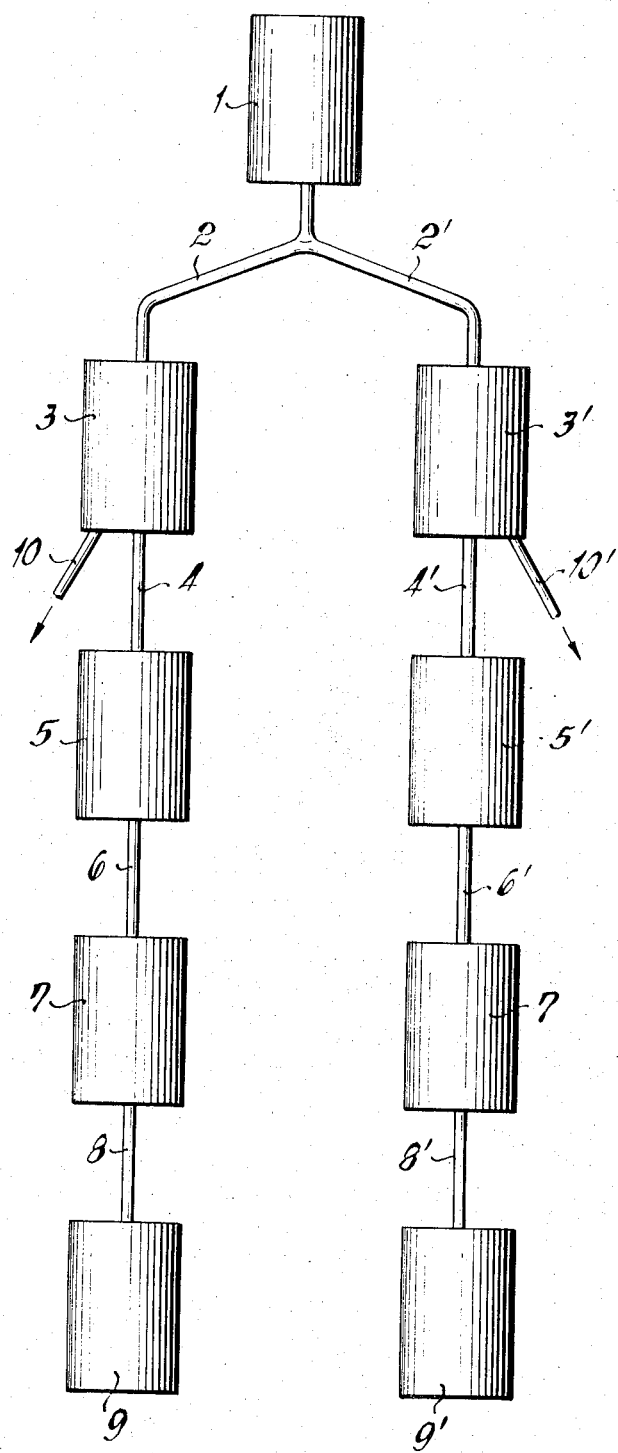

A phosphorus/sulfuric acid-mixture coming from a stirring zone is conveyed to a heated separating zone, in which the mixture is separated, at a temperature at least as high as the melting point of phosphorus, into an upper layer of liquid phosphorus and a lower layer of sulfuric acid; the two layers are cooled down to a temperature lower than the melting point of phosphorus and the lower layer of sulfuric acid is discharged; the upper layer of solidified phosphorus is melted by supplying heat thereto and delivered to a wash zone, in which the phosphorus is water-washed and freed from adhering sulfuric acid.

---

The present invention relates to the purification of yellow phosphorus, which may have been produced by electrothermal means, by intimately mixing liquid phosphorus with sulfuric acid in a stirring zone and successively isolating the phosphorus from the sulfuric acid.

It has already been reported that relatively pure yellow phosphorus can be produced in commercial quantities, for example by electrothermal means. The phosphorus so made has a purity sufficient for a plurality of uses. Very pure material is, however, required to be employed for special uses including, for example, the production of semiconductors, phosphors and getter material. The phosphorus contaminants include inorganic material, such as arsenic, lead, iron, manganese, silicon, calcium and magnesium, and further include lower phosphorus oxides and organic compounds, for example hydrocarbons and phenols.

The various methods of purifying yellow phosphorus described in literature include the distillation with steam, which is the process most commonly used. This process dictates the use of considerable energy, yet a relatively small midfraction furnishes phosphorus which, in fact, is extensively free from inorganic contaminants but still includes organic constituents. Furthermore, this process is required to be carried out with the careful exclusion of oxygen. Failing this, the phosphorus is contaminated again by lower oxides. At the temperature prevailing, these corrode the reactor material and further contamination of the phosphorus may originate therefrom.

It has also been reported earlier that concentrated sulfuric acid is an agent useful for purifying phosphorus and minimizing the concentration of both inorganic and organic contaminants therein. This purification is, however, not easy to achieve, especially if exclusive use is made of the liquid phase. The relatively slight difference in density between sulfuric acid and liquid phosphorus may render separation difficult, which may be rendered even more difficult by water adhering to the phosphorus.

If use is made of concentrated sulfuric acid for purifying phosphorus having organic contaminants therein, then it is normal to first place the phosphorus to undergo purification in an agitator vessel, then add a given quantity of sulfuric acid thereto, and intimately mix the two components together for a certain period of time. Following this, agitation is discontinued for some prolonged time, the phases are separated from one another, and sulfuric acid, which is the lower phase, is removed. The slight difference in density between sulfuric acid and phosphorus obviates the formation of an exact surface of separation between the two components upon the separation of sulfuric acid from phosphorus. As a result, it is necessary either to remove a phosphorus portion jointly with the last residue of sulfuric acid, or to leave a sulfuric acid portion in the phosphorus so as to avoid losses of phosphorus. Neither of these two conventional processes, of which one entails losses of phosphorus, and the other yields phosphorus contaminated with sulfuric acid, is satisfactory. Following the removal of sulfuric acid, the phosphorus is discharged into a washing vessel filled with warm water, and the procedure is repeated in discontinuous manner.

It is accordingly an object of the present invention to provide a fully satisfactory and improved process for the purification of phosphorus, more particularly for the separation of sulfuric acid from phosphorus.

The process of the present invention for the purification of yellow phosphorus, which may have been produced by electrothermal means, by intimately mixing liquid phosphorus with sulfuric acid in a stirring zone and successively separating the phosphorus from the sulfuric acid, comprises delivering the phosphorus/sulfuric acid-mixture coming from the stirring zone to a heated separating zone; separating the said mixture in the said separating zone; at a temperature at least as high as the melting point of phosphorus, into an upper layer of liquid phosphorus and a lower layer of sulfuric acid; cooling the said two layers down to a temperature lower than the melting point of phosphorus; isolating the said lower layer of sulfuric acid; melting the said upper layer of solidified phosphorus by supplying heat thereto; delivering the molten phosphorus to at least one wash zone; and water-washing the phosphorus in said wash zone so as to free it from adhering sulfuric acid.

A further feature of the process of the present invention comprises heating the separating zone to a temperature of between about 80 and 90° C. so as to maintain the phosphorus in the liquid state. Following exact separation of the sulfuric acid layer from the layer of phosphorus, the two layers are cooled in the separating zone down to a temperature lower than 40° C., and the phosphorus layer is solidified thereby. Following the removal of the sulfuric acid layer from the separating zone, the liquid phosphorus delivered from the said zone to the wash zone is washed out therein, using water with a temperature of at least 45° C.

Concentrated sulfuric acid should conveniently be used in carrying out the process of the present invention, which enables sulfuric acid to be separated from phosphorus without the need to remove a portion of phosphorus jointly with the sulfuric acid, or inversely to leave a sulfuric acid portion in the phosphorus.

The present invention will now be described with reference to the accompanying drawings wherein:

FIG. 1 is a diagrammatical view illustrating the apparatus of this invention; and FIG. 2 is an enlarged cross-sectional view illustrating the separator in greater detail.

An exemplary apparatus for use in carrying out the process of the present invention is shown diagrammatically in the accompanying drawings, wherein stirrer vessel 1, in which the phosphorus to undergo purification is intimately mixed with sulfuric acid, is connected through line 1 with separator 3, in which sulfuric acid is separated from purified phosphorus. A further conduit 4 runs from separator 3 to intermediary container 5 receiving purified phosphorus. Downstream of container 5 there is washing vessel 7, which is partially filled with hot water travelling through line 6. Vessel 7 is fitted with a conduit 8 connecting it to collector 9 which receives purified phosphorus. Sulfuric acid is removed from separator 3 through outlet 10.

Reference numerals 2', 3', 4', 5', 6', 7', 8', 9', and 10' designate a further purification system of containers and conduits, which are connected to stirrer vessel 1 and disposed parallel to the purification system defined by reference numerals 2, 3, 4, 5, 6, 7, 8, 9, and 10.

FIG. 1 of the accompanying drawings shows separator 3 in greater detail. As can be seen, separator 3 is fitted with an agitator 11, surrounded by a double wall jacket, and conduit 2 coming from stirrer vessel 1 projects thereinto. Separator 3 is first heated with hot water flowing through the double wall jacket and then fed, with agitation, with a mixture of phosphorus and sulfuric acid travelling through conduit 2. Agitation is discontinued and the mixture is found to deposit with separation into two liquid phases. The double wall jacket is then fed with cold water, which replaces the hot water therein, and the two phases are thereby cooled down to temperatures lower than the melting point of phosphorus, which solidifies. Following this, the lowermost phase consisting of sulfuric acid is completely discharged near the bottom of separator 3, through a three-way cock and a conduit 10. By supplying hot water to separator 3, the solidified phosphorus is caused to melt and discharged through cock 12 and conduit 4 into intermediary container 5.

Needless to say a plurality of purification systems, for example in programmed arrangement, may be connected to stirrer vessel 1 (this is not shown in the drawing).

EXAMPLE 1 (CONVENTIONAL PROCESS)

1000 kg. of phosphorus containing between 0.2 and 0.3 percent organic carbon contaminants soluble in benzene were intimately mixed for 20 minutes at a temperature of 80° C. with 150 kg. of concentrated sulfuric acid, in an agitator vessel. Agitation was discontinued and sulfuric acid, which was found to have deposited at the bottom of the agitator vessel, was removed after 10 minutes. Following this, the phosphorus was washed over a period of 5 minutes with 1000 kg. of water having a temperature of 80° C. in a wash vessel. 990 kg. of phosphorus containing 0.04 percent of benzene-soluble contaminants were removed from the wash vessel. 1 percent of phosphorus, based on the quantity initially used, was lost.

EXAMPLE 2 (PROCESS OF INVENTION)

1000 kg. of phosphorus containing between 0.2 and 0.3 percent of benzene-soluble organic contaminants and 150 kg. of concentrated sulfuric acid were placed in stirrer vessel 1 shown in the accompanying drawings. At a temperature of 85° C., the material in the vessel was intimately stirred for 15 to 25 minutes. Agitation was then arrested and the mixture discharged into one of separators 3 and 3' which had a volume the same as that of stirrer vessel 1. Following a precipitation period of 3 to 5 minutes in heated separator 3 or 3'—the temperature prevailing therein was as high as that prevailing in stirrer vessel 1—the phosphorus was found to have separated from the sulfuric acid. Following this, the jacket heater connected to separator 3, 3' was used for the supply of cooling medium and a temperature lower than 40° C. was reached within 5 to 15 minutes, at which the phosphorus began to solidify. Sulfuric acid which was found to have deposited in the lower part of separator 3, 3' was discharged through line 10, 10' and delivered to a reservoir reciving unfiltered sulfuric acid (not shown in the drawing). Following the removal of sulfuric acid, the jacket heater was used to establish a temperature of 80° C. in separator 3, 3' and the phosphorus in the upper part of separator 3, 3' was liquefied thereby within 5 to 10 minutes. The liquid phosphorus was delivered to intermediary container 5, 5' receiving purified phosphorus, which was continuously fed to wash vessel 7, 7'. By thorough agitation and the addition of warm water over a period of between 1 and 3 minutes, the phosphorus was freed from adhering residues of sulfuric acid. 998 kg. of phosphorus containing 0.02 percent of benzene-soluble contaminants were removed from wash vessel 7, 7'. 0.2 percent of phosphorus, based on the quantity intially used, was lost.

We claim:

1. In the process for the purification of yellow phosphorus by intimately mixing liquid phosphorus with concentrated sulfuric acid in a stirring zone and delivering the phosphorus/sulfuric acid-mixture obtained from the stirring zone to a separating zone heated at a temperature at least as high as the melting point of phosphorus, with the resultant formation of an upper layer of liquid phosphorus and a lower layer of sulfuric acid and separating the said two layers from one another, the improvement which comprises, prior to effecting the separation, cooling the said two layers down to a temperature lower than the melting point of phosphorus; isolating the said lower layer of sulfuric acid; melting the said upper layer of solidified phosphorus by supplying heat thereto; delivering the molten phosphorus to at least one wash zone; and water-washing the phosphorus in said wash zone so as to free it from adhering sulfuric acid.

2. The process as claimed in claim 1, wherein the separating zone is heated to a temperature of between about 80 and 90° C.

3. The process as claimed in claim 1, wherein the said two layers in the said separating zone are cooled down to a temperature lower than 40° C.

4. The process as claimed in claim 1, wherein the liquid phosphorus coming from the separating zone and passing to the washing zone is washed therein with water having a temperature of at least 45° C.

5. The process as claimed in claim 1, wherein the stirring zone is connected to at least two purifying zones comprising a separating zone and washing zone, for continuous operation.

References Cited

UNITED STATES PATENTS

| | | | |
|---|---|---|---|
| 3,205,041 | 9/1965 | Cremer et al. | 23—223 X |

FOREIGN PATENTS

| | | | |
|---|---|---|---|
| 1,936,939 | 9/1970 | Germany | 23—223 |
| 156,287 | 10/1957 | Australia | 23—223 |
| 1,224,272 | 3/1971 | Great Britain | 23—223 |

OSCAR R. VERTIZ, Primary Examiner

G. A. HELLER, Assistant Examiner